United States Patent [19]
Fischer

[11] Patent Number: 4,964,132
[45] Date of Patent: Oct. 16, 1990

[54] LASER ARRANGEMENT WITH FREQUENCY STABILIZED AND INTENSITY STABILIZED LASER EMISSION

[75] Inventor: Georg Fischer, Gilching, Fed. Rep. of Germany

[73] Assignee: Siemens Aktiengesellschaft, Berlin and Munich, Fed. Rep. of Germany

[21] Appl. No.: 362,479

[22] Filed: Jun. 7, 1989

[30] Foreign Application Priority Data

Jun. 7, 1988 [DE] Fed. Rep. of Germany ....... 3819333

[51] Int. Cl.$^5$ .............................................. H01S 3/13
[52] U.S. Cl. ........................................ 372/32; 372/29; 372/31; 372/19; 372/55
[58] Field of Search ....................... 372/32, 29, 19, 20, 372/31, 38, 35, 92, 55

[56] References Cited

U.S. PATENT DOCUMENTS 3,711,786  1/1973  Vautier et al. ........................ 372/32
4,745,606  5/1988  Uehara et al. ........................ 372/32

FOREIGN PATENT DOCUMENTS 0287681  12/1987  Japan ..................................... 372/32

OTHER PUBLICATIONS

G. Fischer, "Simple and Effective Frequency Stabilization for HeNe Lasers at 1-52 m", Electronics Letters, Feb. 26, 1987, vol. 23, No. 5, pp. 206-208.

Alan D. White, "Gas-Laser Frequency Stabilization", Microwaves, Jan. 1967, pp. 51-61.

Primary Examiner—William L. Sikes
Assistant Examiner—Georgia Y. Epps
Attorney, Agent, or Firm—Hill, Van Santen, Steadman & Simpson

[57] ABSTRACT

In a laser in which two longitudinal modes of a laser emission are excited, high frequency stability and intensity stability of the laser emission are achieved in that the dimensioning of the laser is used to produce a coupling of the intensities of the two modes and thus at least one minimum of the gain curve over frequency appears. This curve is swept by modifying the optical length of the resonator and an extreme value of the curve is thereby stored. Proceeding from this extreme value, an intensity value is identified which deviates from the extreme value by a prescribed amount and this intensity value is kept within prescribed limits by adjusting the optical resonator length. This invention is particularly suitable for gas lasers and in particular helium neon-lasers.

8 Claims, 1 Drawing Sheet

LASER ARRANGEMENT WITH FREQUENCY STABILIZED AND INTENSITY STABILIZED LASER EMISSION

BACKGROUND OF THE INVENTION

1. Field of the Invention

The present invention is directed generally to a laser arrangement having a laser with an optical resonator dimensioned so that one or two longitudinal modes of laser oscillation are excited, whereby a polarizer is present in the laser resonator.

2. Description of the Related Art

A laser arrangement is disclosed in Electronics Letters, Feb. 16, 1987, Volume 23, No. 5, pages 206–208. The laser arrangement disclosed therein includes a control in the basis of comparing two modes that lie in the steep regions on the rise or fall of the curve of the gain over frequency so that only a relatively small difference between the two modes is allowed since the control otherwise becomes instable and tends to cut out. This is based on the steepness of the curve of the gain over the frequency.

Some frequency stabilized laser arrangements that relate to monomode lasers are disclosed in the periodical Microwaves, January 1967, pages 51–61. The means for stabilization disclosed in this periodical each share a characteristic wherein a quantity such as resonator length or rotational direction of a circularly polarized light is periodically modified given use of a Zeeman absorption cell as a discriminator. The periodic modification yields a modulation of the laser power, or of the power of the resonator output, that is then converted into a frequency stabilization means. In the known stabilization methods, the laser modulation must occur in low frequency fashion so that a relatively great setting time is required which is in the order of magnitude of a second, for example.

SUMMARY OF THE INVENTION

An object of the present invention is to provide a laser arrangement which attenuates the oscillatory, secondary mode used for the control to such an extent that the secondary mode is no longer disturbing even with modulation of the laser signal.

In a laser arrangement having an optical resonator and a polarization means, this and other objects of the invention are achieved in that, due to the structure in the two mode operation, a coupling of the intensities of the two modes occurs and at least one minimum produced as a result thereof appears in the curve of power over frequency. A comparator for the intensity or power of the laser emission is provided which compares a first extreme value of the intensity to a rated value in terms of operational sign and level and is capable of calculating a second extreme value that observes a prescribed limit value referred to the first extreme value in terms of operational sign and level. The comparator controls a control means for the optical length of the resonator for further maintaining this limit value.

According to the present invention, it is adequate to only partially sense the curve of the laser amplitude over frequency by controlling the resonator length until the corresponding extreme values are found. An extreme value can be immediately recognized from the differentiation of the recorded curve and one can discover whether a maximum or a minimum is involved. Insofar as more than one maximum or minimum can occur, it is recommended to input an absolute value or a value range for the extreme value as a further condition. Proceeding from this extreme value, for example, a next successive extreme value is identified which corresponds to the conditions for the spacing and the operational sign. The values of the second extreme value are then kept within prescribed tolerances by adjusting the resonator length.

This control principle allows a laser line that is already largely suppressed to be utilized for frequency control and, thus, guarantees that the stronger laser line lies in the maximum of its laser power. As a result thereof, an extremely high stability of the output power of the laser is achieved with moderate demands made of the frequency stability. In one example, the frequency deviation is, for example, $\pm 10^{-6}$.

The frequency control of the invention is executed in an especially advantageous fashion when two minimums are generated on the curve of the intensity over frequency wherein the second of the two minimums is more greatly pronounced. The second, more greatly pronounced minimum in the power curve can then be used to hold the principle mode in the middle, highest power range. To utilize the second, especially pronounced minimum of the laser power for frequency stabilization, a lower limit value is advantageously input for the extreme value to be stored. The lower limit value lies above the secondary maximum of the power curve and minimum spacing from the stored intensity value is selected to be negative and larger in terms of amount than the spacing of the intensity of the less pronounced minimum on the curve of the intensity over the frequency from the highest maximum of this curve.

DESCRIPTION OF THE PREFERRED EMBODIMENTS

Figure 1:
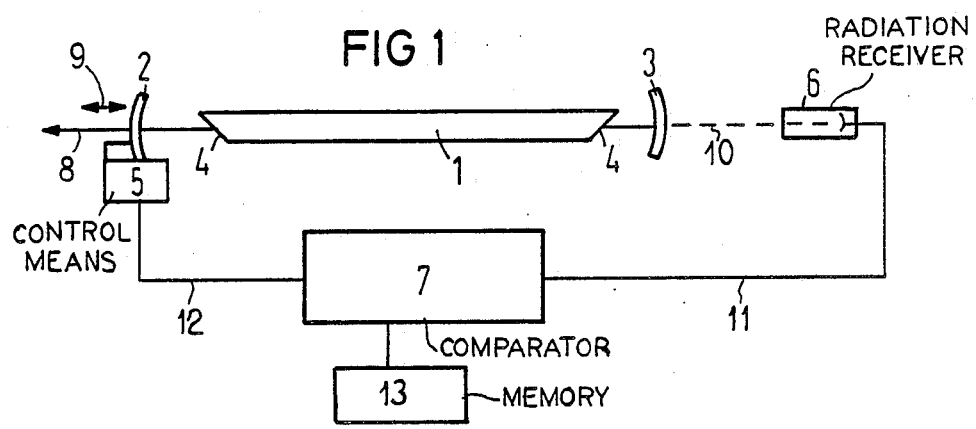
FIG. 1 is a schematic illustration showing a laser arrangement according to the present invention.

In FIG. 1 is shown a laser tube 1 which is terminated with Brewster windows 4 so that a linearly polarized laser emission 8 emerges from the laser tube 1. A resonator mirror 2 is provided in the path of the laser beam 8 and is displaceable along the direction of the laser beam 8, as indicated by arrows 9, by a control means 5. The control means 5 may be any of the known means for adjusting resonator length, such as a piezo-electric element. The first resonator mirror 2 is a partially reflecting mirror as part of the laser resonator arrangement through which the laser beam 8 is coupled out. A second resonator mirror 3 at an opposite end of the laser tube 1 is a substantially opaque mirror 4 of the laser resonator arrangement, yet which still lets a certain residual radiation 10 through. The residual radiation, as indicated by dashed line 10, is utilized for frequency control. A radiation receiver 6 is positioned to receive the residual radiation 10 and convert it into an analogue electrical signal, which is supplied to a comparator 7 along lead 11.

The comparator 7 controls the control means 5 via connection 12 and, through the radiation receiver 6, measures the laser intensity, or power, and forms the differential thereof. As soon as a first extreme value for the laser power appears, the operational sign thereof (i.e. whether it is maximum or minimum) and the level thereof is compared to stored reference values stored in a memory 13. Insofar as the comparison has a positive result, the further course of the power, or intensity curve is sampled for a further extreme value which satisfies the limit conditions with reference to the first extreme value in terms of direction and spacing. As soon as a further extreme value lying within said tolerances is found, the second extreme value is held within the prescribed tolerances by variation of the length of the control means 5.

The control means 5 is preferably a piezoelectric member which displaces the laser mirror 2 in the direction of the arrows 9. Of course, other control means for adjusting the optical length of the resonator structure are also suitable for this purpose, for example, an electro-optical element lying in the beam path of the resonator which has a controllable refractive index.

In practice, systematic differences occur given coupling of two laser lines that are of approximately the same strength. The laser line lying at the higher frequency is suppressed to a considerably greater degree than the line that lies at the lower frequency. This is indicated by the intensity curve in FIG. 2. Accordingly, an extremely deep minimum in the intensity curve is formed at a point B which is preferably suited for frequency stabilization.

Figure 2:
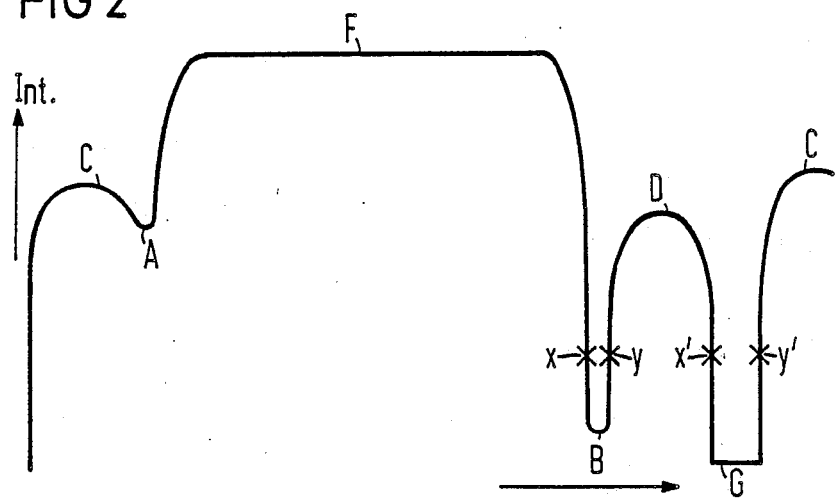
FIG. 2 is a diagram of the laser intensity, or power, over the resonant frequency of the laser in the region of the gain curve of a laser.

In the example of FIG. 2, a middle region of the intensity curve lies in the maximum of the gain curve of the laser so that a flat maximum F of the intensity curve derives. A preferred operating mode in this case is characterized by an operating point of the main laser line in the flat maximum F of the intensity curve. Coming from low frequencies, accordingly, the value of the maximum F is first stored and, proceeding therefrom, a smaller limit value for the reference frequency is defined, the level thereof lying noticeably below the level of the first minimum at point A. The first minimum that lies below this limit value is sought and retained at point B. The mode spacing of two neighboring modes on the frequency axis is thereby set with an appropriate length of the resonator such that when one mode in the minimum B is fixed, the following mode comes to lie in the next region F of the intensity curve. A practically monomode laser beam having a high, extremely constant intensity is thereby available at the laser output.

In addition to this especially advantageous embodiment of the control of the invention, a minimum A or one of the secondary maximums C and D can also be correspondingly utilized for frequency stabilization.

As required, the first extreme value and the limit value can be recalculated at every measurement or can be stored over a longer time. The levels of the minimums at A and B of FIG. 2 can be adapted to the requirements in a broad range by applying magnetic fields to generate a Zeeman effect and/or by selecting a corresponding gas pressure.

Figure 3:
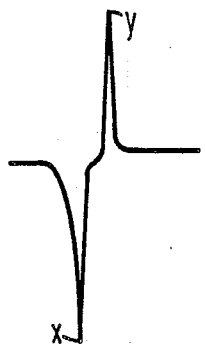
FIG. 3 is a diagram showing a differential of FIG. 2 in a region of a minimum B.

An especially high frequency stability is achieved in that the differential is formed in the descending and ascending parts of the power curve adjacent the second extreme value, in that the amount (independently the operational sign) in differentials in the descending part is compared to the amount of the differential in the ascending part and in that the resonator length is adjusted until the two amounts of the differentials differ by no more than a prescribed value. An adaptation to asymmetries of the curve of the differentials over the frequency axis is enabled in that the difference between the two amounts of the differentials is kept between two prescribed values. Measurement can thereby be carried out in the proximity of maximums X and Y of the curve shown in FIG. 3 of the differentials over the frequency and an especially high frequency stability can be achieved in this fashion.

A simple design for the comparator 7 is possible in that a narrow region G in which only one mode of the laser oscillation appears is set in the intensity curve or gain curve by a corresponding dimensioning and design of the laser. Proceeding from an extreme value of the gain curve, the narrow region is set in that an upper limit for the second extreme value is set that can only be observed in the region G and whereby the width of the range G is selected smaller than the a region of the first extreme value lying in the mode spacing in that an admissible amplitude fluctuation is observed.

In this embodiment, the laser mode employed for the control has completely disappeared between the control events and the outlay is nonetheless kept low. An increased amplitude stability and frequency stability is achieved in that the limits of the region G in this embodiment are sampled by modifying the optical resonator length at prescribed time intervals and in that a reference value for the position of the main mode on the frequency axis is identified from these limits and the optical resonator length is set according to this reference value. A high frequency stability can thereby be achieved on the basis of simple amplitude measurements.

A power stability and frequency stability is achieved in a laser arrangement of the invention without an external amplitude normal and/or frequency normal, being obtained only by interpreting the electrical signals that are acquired by the laser itself. An especially high reproduceability of the results is thereby achieved without matching problems.

The present invention is useful to stabilize gas lasers, and particularly He-Ne lasers.

Although other modifications and changes may be suggested by those skilled in the art, it is the intention of the inventor to embody within the patent warranted hereon all changes and modifications as reasonably and properly come within the scope of his contribution to the art.

I claim:

1. a laser arrangement having high intensity stability and frequency stability of a laser emission, comprising:
    an optical resonator means for exciting two longitudinal modes of laser operation;
    a polarization means in said optical resonator for polarizing said two longitudinal modes of laser operation;
    a control means for controlling an optical length of said optical resonator; and
    means for comparing a first extreme value of an intensity of the laser emission to a rated value in terms of operational sign and level, said means for comprising finding out a second extreme value which observes a prescribed limit value referenced to the first extreme value in terms of operational sign and level so that in two mode operation a coupling of the intensities of the two modes occur and at least one minimum produced as a result thereof appears in the gain curve over the frequency, said control means maintaining said prescribed limit value.

2. A laser arrangement as claimed in claim 1, wherein said optical resonator includes two mirrors and wherein one of said laser mirrors is controlled by said control means and displaced in a direction of the laser beam for identifying the extreme values and for controlling the length of the resonator.

3. A laser arrangement as claimed in claim 1, with dimensions such that two minimums are present in the intensity curve, in that the minimum spacing from the stored intensity value is more negative and larger than the spacing of the intensity of the less pronounced minimum from the maximum value of the intensity curve.

4. A laser arrangement as claimed in claim 1, wherein said comparator stores a maximum value of the gain curve and a limit value is defined from and base on said maximum value limiting the second extreme value of the gain curve.

5. A laser arrangement as claimed in claim 1, wherein said means for comprising forms differentials in the ascending and descending parts of the intensity curve adjoining the identified second extreme value and in that the amount of the differential and the descending part is compared to the amount of the differential and the ascending part; and in that the optical resonator length is adjusted until the two amounts of the differentials differ by no more than a prescribed value.

6. A laser arrangement as claimed in claim 5, wherein said means for comparing holds the difference between the two amounts of the differentials between two prescribed values.

7. A laser arrangement as claimed in claim 1, wherein said optical resonator is of a dimension and design to establish a narrow region in the intensity curve in which only one main mode of the laser oscillation appears; said means for comprising using an extreme value of the intensity curve to set an upper limit for the second extreme value which is capable of being maintained only by the narrow region; and in that the width of the narrow region is selected smaller that the region of the first extreme value lying in the level spacing in which an allowable amplitude fluctuation is maintained.

8. A laser arrangement as claimed in claim 7, wherein said control means modifies the optical resonator length at prescribed time intervals to sample the limits of the narrow region and in that a reference value of the position of the main mode on the frequency axis is identified from these limits.

* * * * *